United States Patent [19]
Gallagher et al.

[11] Patent Number: 5,512,233
[45] Date of Patent: Apr. 30, 1996

[54] METHOD OF MAKING A PANEL WITH A SPRAY FORMED SKIN

[75] Inventors: Michael J. Gallagher, Hampton; William M. Humphrey, Dover, both of N.H.

[73] Assignee: Davidson Textron Inc., Dover, N.H.

[21] Appl. No.: 329,313

[22] Filed: Oct. 26, 1994

[51] Int. Cl.$^6$ .................................................. B29C 43/02
[52] U.S. Cl. .................... 264/321; 264/309; 156/245; 156/298; 156/307.1
[58] Field of Search .................. 264/309, 321; 156/245, 293, 298, 307.1

[56] References Cited

U.S. PATENT DOCUMENTS

| | | | |
|---|---|---|---|
| 3,816,233 | 6/1974 | Powers | 264/321 |
| 4,217,325 | 8/1980 | Colby | 264/245 |
| 4,389,454 | 6/1983 | Horacek et al. | 264/255 |
| 4,797,320 | 1/1989 | Kopp et al. | 428/316.6 |
| 4,828,908 | 5/1989 | Park et al. | 428/247 |
| 5,082,609 | 1/1992 | Rohrlach et al. | 264/309 |
| 5,089,328 | 2/1992 | Doerer et al. | 428/308.4 |

FOREIGN PATENT DOCUMENTS 3-65315  3/1991  Japan ........................... 264/309

*Primary Examiner*—Allan R. Kuhns
*Attorney, Agent, or Firm*—Reising, Ethington, Barnard & Perry

[57] ABSTRACT

A method is provided for making a lightweight composite panel in which an outer skin is developed by spraying a heat curable reactive urethane formulation onto a contoured heated surface of a mold cavity of a press mold and maintained thereon in a semi-cured state. A substrate-forming foam layer impregnated with a hardening compound is positioned against a second foam layer and the layers in turn laid over the semi-cured urethane skin. The foam layers are urged together within the mold under heat and pressure at a temperature sufficient to accelerate activating of the hardening compound to render the substrate-forming foam layer relatively stiff, hard and self-supporting and less compressible than that of the second foam layer, and to bond the foam layers to one another at their interface, while forcing the semi-cured skin material into interstices of the second foam layer and thereafter curing the skin producing a bond between the skin and the second foam layer.

8 Claims, 3 Drawing Sheets

METHOD OF MAKING A PANEL WITH A SPRAY FORMED SKIN

TECHNICAL FIELD

This invention relates to a method of making composite panels and the panels resulting from the method and more particularly to composite panels having a decorative skin supported on a relatively hard, self-supporting, foam backed substrate.

BACKGROUND OF THE INVENTION

In the manufacture of composite panels such as used as interior trim panels in cars, vans and trucks, it is desirable that these panels be lightweight and have a skin or cover with a soft backing supported on a relatively hard substrate or core for mounting in the vehicle interior. Many various methods have been used in the past to form such panels and they generally require several steps which play a substantial factor in their costs, However, there is a method for making such a panel in one simple step.

In the above referred to single step method, an assembly of foam layers is built up comprising a core-forming foam layer, an intermediate foam layer, and a cover-backing soft foam layer with a scrim sheet under the core-forming foam layer and a cover sheet over the cover-backing foam layer. The core-forming layer is impregnated with a hardening compound coating the cells walls of the foam that is activated with heat. The intermediate foam layer and the cover-backing foam layer may also be impregnated with the hardening compound but in lesser amounts. The panel is formed by subjecting this layered assembly to heat and pressure in a single compression molding operation at a temperature that activates the hardening compound. The layers of the assembly are bonded together either by the hardening compound or by thermoplastic films that are inserted between the layers and are melted by the heat of the molding operation and then become adhesive. In the molded panel, the foam core layer becomes relatively hard and self-supporting, the foam cover-backing layer remains relatively soft and compressible to the touch, and the intermediate foam layer becomes not as hard as the foam core layer and not as soft as the cover-backing layer. The relative softness or hardness of the layers can be varied as desired by the amount of the hardening compound with which they are impregnated. And the degree of softness or hardness can also be varied as desired by the thickness, density and compression of the foam layers. Furthermore, the panel may be formed consisting essentially of only a self-supporting foam core or substrate, a second foam layer and a cover sheet. This method and the panels made thereby are disclosed in U.S. Pat. No. 5,089,328 issued to Doerer et al.

While the above single step compression molding method and the panels made therefrom have proven generally satisfactory, it has been discovered that certain difficulties can occur when the cover layer or skin is a plastic sheet of vinyl or expanded vinyl as currently used for car and truck interior trim panels. In the compression molding of the layers, the vinyl skin is actually cold formed as no heat is introduced into the compression molding process except through the press mold to react the hardening compound in the foam core layer. When plastic is cold formed, it retains a significant amount of memory about its previous state. And upon removing the laminated layers from the mold, the now contoured plastic sheet attempts to revert to its original form (i.e. that of a plane sheet). This results in residual stresses in the panel to various degrees depending on the amount of the cold working required to obtain the desired panel contour and can cause the panel to warp when removed from the compression molding press dies. The core or substrate is not substantially stiff enough to prevent this warping from occurring where the cold drawing is of such a large because of the low density of its foam structure and, consequently, lower physical properties as compared with other core materials such as the thermosetting plastics used for trim panels.

Another problem with the use of a plastic sheet as the cover layer or skin is the occurrence of wrinkles. Wrinkles are typically eliminated by greater stretching or drawing of the plastic sheet during the compression molding through greater retention of the sheet by the die clamping means. And this greater stretching of the plastic sheet increases the residual stresses created during the cold forming resulting in an even greater tendency to cause panel warpage. Moreover, it is not normally possible to stretch the plastic skin without also stretching the other layers of the laminate assembly. And because these other layers are not as elastic as the plastic sheet, they are prone to tear much easier when attempting to remove the wrinkles in the plastic skin by greater stretching.

SUMMARY OF THE INVENTION

The method of the present invention solves these problems while providing additional advantages in the making of a superior composite panel in one single compression molding step and also with an optional additional step. In its essential form and instead of using a vinyl sheet, the laminate assembly is built up from a spray formed urethane skin layer, a substrate-forming foam layer and a second foam layer. The skin layer is formed by spraying a heat curable reactive urethane formulation onto the surface of a heated compression molding lower contour die having the curved contour and surface graining, if any, of that desired in the finished panel. The material is sprayed so as to have a substantially uniform thickness and consistency across the entirety of the die surface and the temperature of the lower contour die is maintained at a suitable curing temperature for this material. The urethane skin thus formed is completely without any residual stresses that would tend to warp the panel following compression molding of the other layers therewith. The substrate-forming foam layer is impregnated with a compound that sets when activated with heat to stiffen the impregnated foam layer and is laid over the second foam layer which is laid over the solid urethane skin layer while the latter is in a semi-cured state on the lower contour die. And the assembly of layers is then bonded together between the lower contour die and an upper contour die in a press mold assembly under heat and pressure while conforming the impregnated foam layer and the second foam layer to the curved contours of the dies and pressing the latter foam layer against the spray formed urethane skin layer in a compression molding operation. This operation is carried out at a temperature in the upper contour die at which activation of the stiffening compound is accelerated and the substrate-forming foam layer is rendered self-supporting and less compressible than the second foam layer and the compound migrates from the former layer into the latter layer and after activation produces a bond between the foam layers at their interface. Meantime in the compression molding operation, the urethane skin layer while in a semi-cured state is forced into interstices in the second foam layer producing a bond therebetween after curing of the urethane skin layer. In carrying out this process, the hardener activating temperature is maintained in the upper contour die and is substantially greater than that maintained in the lower contour die to cure the sprayed urethane skin.

While the above steps are preferred as the whole process takes place in a single press mold, the relatively hard foam substrate and soft foam layer can be preformed in another press mold with temperatures and compression forces set to the hardener and compression molding involved therein. Once formed, this premolded portion of the laminate panel structure is attached to the upper contour die of this mold or to another upper press die and positioned over a lower contour die having the sprayed urethane skin and this die set is then closed while the sprayed skin is still in a semi-cured state as before. But now the latter press die set is relieved of any heating and stretching duties for the foam layers and the mold temperature is concentrated on just curing the urethane skin to bond same to the soft foam layer.

In addition to the above noted advantages, it will be appreciated that there are no problems with voids as in a reactive injection molding (RIM) process used to form both a urethane foam substrate layer and a urethane soft foam layer. Moreover, superior skin performance is gained in the use of a urethane skin as compared with a flexible expanded vinyl skin or cover while avoiding the problems associated with stretching the latter in a compression molding operation.

It is therefore an object of the present invention to provide a new and improved method of making a composite panel and the panel produced by the same.

Another object is to provide a compression molded composite panel having a sprayed urethane skin, an intermediate relatively soft foam layer and a relatively hard and stiff foam substrate layer.

Another object is to provide a compression molded composite panel having a sprayed urethane skin bonded to a relatively soft foam layer that is bonded to a relatively hard and stiff foam substrate layer wherein the foam layers are compression molded together and to the urethane skin in one die set with the substrate produced by impregnating a foam layer with a heat activated hardener and the bond between the urethane skin and the relatively soft foam layer produced from the urethane skin while in a semi-cured state during the compression molding operation.

Another object is to provide a compression molded composite panel having a sprayed urethane skin bonded to a relatively soft foam layer that is bonded to a relatively hard and stiff foam substrate layer wherein the foam layers are compression molded together in one die set with the substrate produced by impregnating a foam layer with a heat activated hardener and the compression molded foam layers are then bonded at the soft foam layer to the urethane skin layer in a second compression molding die set with the latter bond produced from the urethane skin layer while in a semi-cured state by the semi-cured skin being forced into the soft foam layer at their interface.

These and other objects, advantages features of the present invention will become more apparent from the following description and accompanying drawings in which:

DETAILED DESCRIPTION OF THE DRAWINGS

Figure 1:
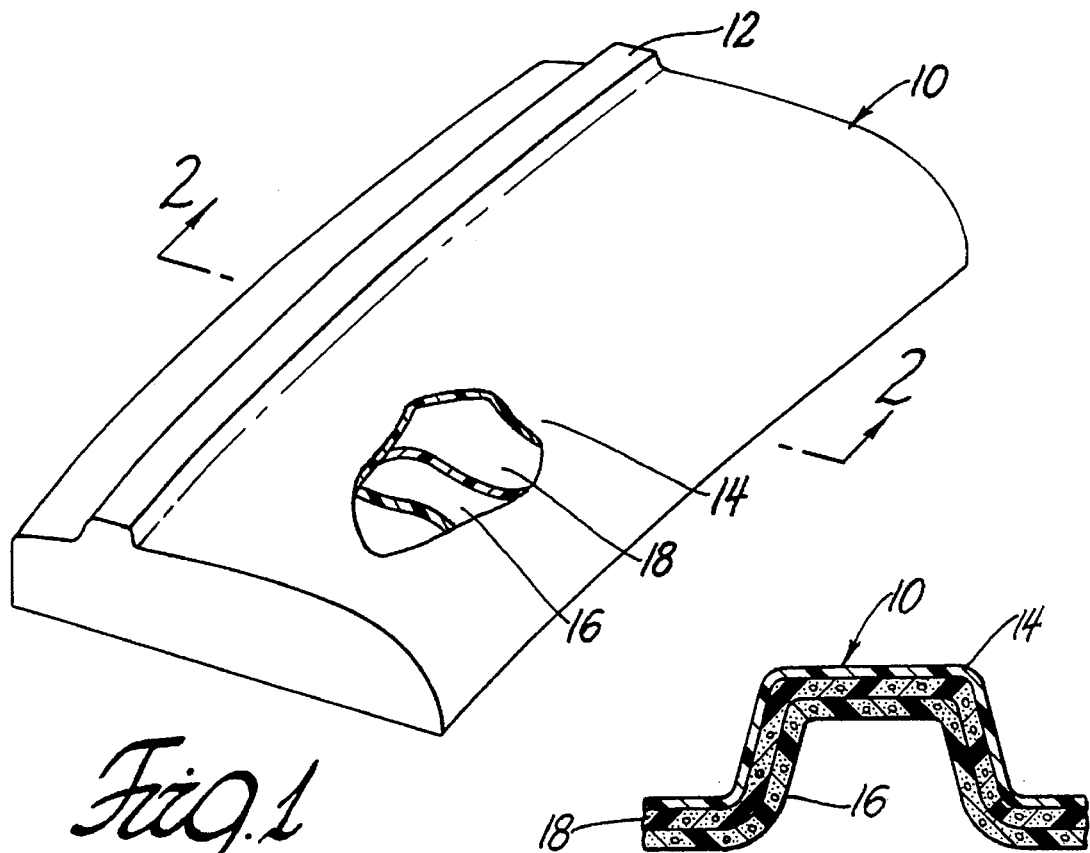
FIG. 1 is a perspective view of an automotive interior trim panel with parts broken away to show the interior construction thereof.
Figure 2:
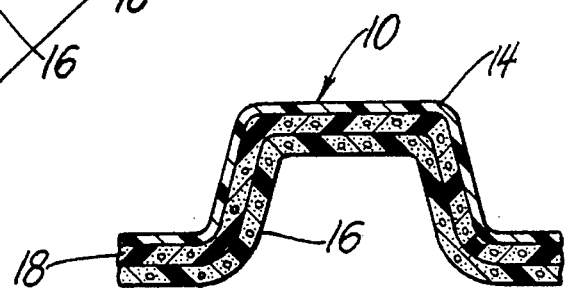
FIG. 2 is an enlarged partial sectional view taken along the line 2—2 in FIG. 1 when looking in the direction of the arrows.

Referring to FIGS. 1 and 2, there is shown an automotive interior trim panel 10 designed for installation in the interior of an automobile. The panel 10 is of thin, light weight construction and has a curved contour including a projecting ridge 12 extending there across. The panel essentially comprises a thin urethane skin 14 with a grained texture, a relatively thick and hard and stiff foam substrate layer 16, and an intermediate relatively thick and soft foam layer 18. A hardening compound coats the walls of the cells of the foam substrate layer 16 and forms a bond between the two foam layers 16 and 18 and the urethane skin 14 while in a semi-cured state has been forced into the interface of the soft foam layer 18 to form a bond therewith.

Figure 4:
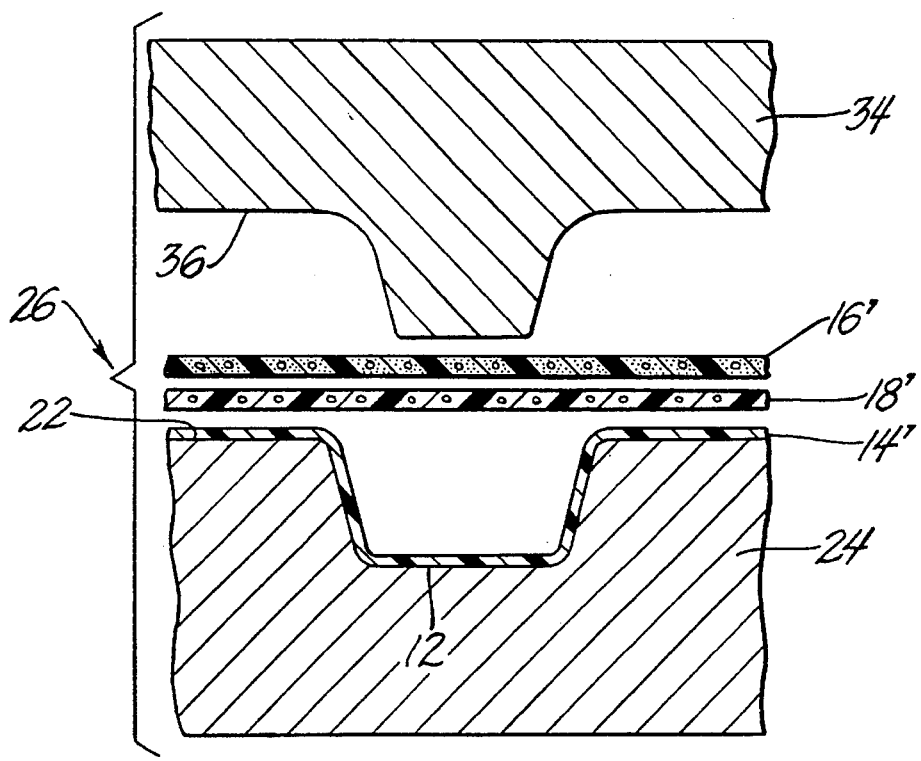
FIG. 4 is a view of the lower press die with the urethane skin formed thereon in FIG. 3 positioned below the upper press die of the press mold and with the sheets of foam used to form the foam layers of the panel in FIG. 1 positioned therebetween in preparation for compression molding operation, only a portion of the sheets of foam and the upper press die being shown and in section.

The foam layers or laminations 16 and 18 are preferably uniform in thickness and are made as illustrated in FIG. 4 from soft, flexible foam sheets 16' and 18', respectively, of any suitable expanded, reticulated or open cell plastic material such as polyether, polyolefin, polyester or urethane, or any combination thereof. The sheets 16' and 18' may have the same or a different thickness and cell size depending on the physical characteristics desired in the finished panel. In the preferred embodiment of the panel, both of the foam sheets 16' and 18' are sheets of urethane foam with the preference for the latter residing in its compatibility with the urethane skin and obtaining a superior bond there between when the latter while in a semi-cured state is forced into the cells of the latter. The foam sheet 16', which becomes the substrate or base layer 16 of the panel, is impregnated or saturated with a heat accelerated hardening compound that enters and fills the cells of the foam and coats the cell walls. The hardening compound is preferably selected from the group comprising isocyanates and having consequently at least one —NCO group in its formula. The hardening compound undergoes a chemical reaction and becomes thermoset which makes the impregnated foam harder and stiffer to thereby form a supporting structure for the other layers. The hardening compound also migrates across to the other foam layer 18' at their interface to form a bond there between in a compression molding operation at a temperature of about 200°–300° F. that accelerates the hardening of the compound. The formation of a panel in a single compression molding operation with such a hardener impregnated core or substrate forming foam layer, a soft intermediate foam layer with and without the hardener, and a soft foam backed flexible plastic cover sheet of vinyl or expanded vinyl is disclosed in detail in the aforementioned U.S. Pat. No. 5,089,328 issued to Doerer et al. which is hereby incorporated by reference.

Figure 3:
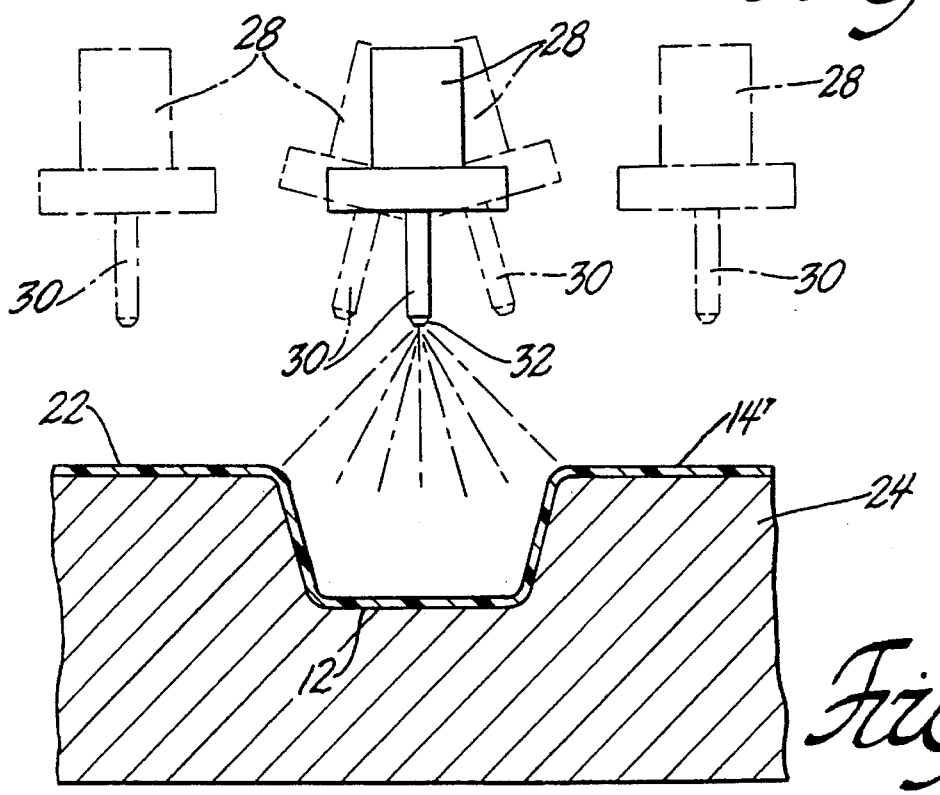
FIG. 3 is a diagrammatic view illustrating the making of the urethane skin of the panel in FIG. 1 on the lower press die of a press mold prior to the compression molding operation, only a portion of the lower press die and urethane skin being shown and in section.

In accordance with the present invention and instead of a flexible plastic sheet of vinyl or expanded vinyl as in the above Doerer et al. patent, the skin or cover 12 is made of urethane in a spraying operation using the cavity in the lower press die of the press mold that is then used to compression mold the panel. Referring to FIG. 3, a chemically reactive urethane formulation is sprayed onto the surface of a mold cavity 22 in the lower contour die 24 of a press mold generally designated as 26 (see FIGS. 4 and 5) to first form a thin skin producing layer 14' with a desired thickness of for example about 1.0 millimeters or less. The lower contour die cavity 22 duplicates the desired contour of the exterior or front side of the panel 10 and is grained to impart a grained appearance to the external side of the skin. The urethane formulation is preferably that of a light and UV stable, aliphatic, urethane elastomer. The elastomer is made from a two-component reactive chemistry that is processed at temperatures of about 140°–170° F. The liquid urethane components are processed in a conventional high pressure reaction injection molding (RIM) system wherein they are impingement mixed at high velocities in a mixhead 28 with injection pressures of about 1500–2000 psi and sprayed onto the mold surface 22 at a rate of about 10–100 grams per second from the mixhead by a spray wand 30 with a suitable spray nozzle 32 at its distal end. The spray rate is preferably maintained in the low end of the above range at a rate of 10–30 grams per second for best results. The mixhead may be operated manually or with robot (not shown). Preferably, the urethane skin forming formulation is applied to the surface of the mold cavity with a robot to ensure uniformity of thickness and consistency.

The lower contour die 24 is preheated to the above processing temperature of the urethane formulation and on the spraying thereof onto the surface of the cavity 22, the thus formed skin producing layer 14' begins to cure as the reaction progresses to form the skin 14. Meantime, the upper contour die 34 of the press mold is preheated to between 200°–350° F. for a compression molding operation in which the foam layers are compression molded between and to the contour of the dies 24 and 34 and the hardening compound in the foam layer 16' is accelerated like in the Doerer et al. patent to harden and stiffen the contoured foam layer 16' and bond the latter to the other contoured foam layer 18'. The upper contour die 34 has a contoured surface 36 that duplicates the desired contour of the back side of the panel 10 and enters the lower die cavity 22 to the point where it assumes a uniform spaced relationship therewith as determined by the compression desired in the contoured foam layers and to the degree necessary to force the sprayed urethane skin 14' while in a semi-cured state into the soft foam layer 18' as will now be described in more detail.

Figure 5:
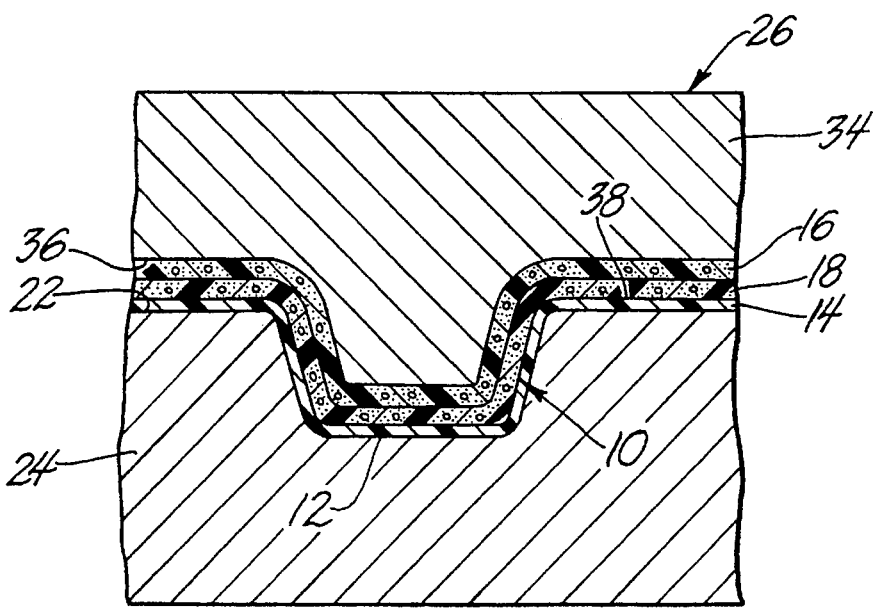
FIG. 5 is a view like FIG. 4 but showing the press mold closed in the compression molding operation to form the panel in FIG. 1.

While the urethane skin 14' sprayed on the lower die cavity surface 22 is still in a semi-cured state and viscous, the lower press die 24 is immediately positioned below the upper press die 34 and the two foam sheets 16' and 18' are immediately positioned there between as shown in FIG. 4 with the substrate foam sheet 16' having previously been impregnated with the hardening compound as in the above Doerer et al. patent. The press mold 26 is then closed as illustrated in FIG. 5 to compression mold the foam sheets 16' and 18' to form the hard and stiff substrate foam layer 16 and soft foam layer 18, respectively, and bond these layers together with the hardener and bond the soft foam layer 18 to the sprayed urethane skin 14. The latter bonding is effected at the interface 38 between the compression molded soft foam layer 16 and the sprayed urethane skin 14 and is accomplished by the forcing of the urethane skin at this interface while still in a semi-cured state into the interstices or open cells of the porous soft foam layer during the compression molding operation. The compression pressures for accomplishing this compression molding and bonding are low and typically less than 50 psi. The press mold is held closed until the urethane skin 14 and substrate foam layer 16 have reacted sufficiently to obtain the desired physical properties after which the press mold is opened and the thus laminated structure is removed and trimmed to form the finished panel 10.

Figure 6:
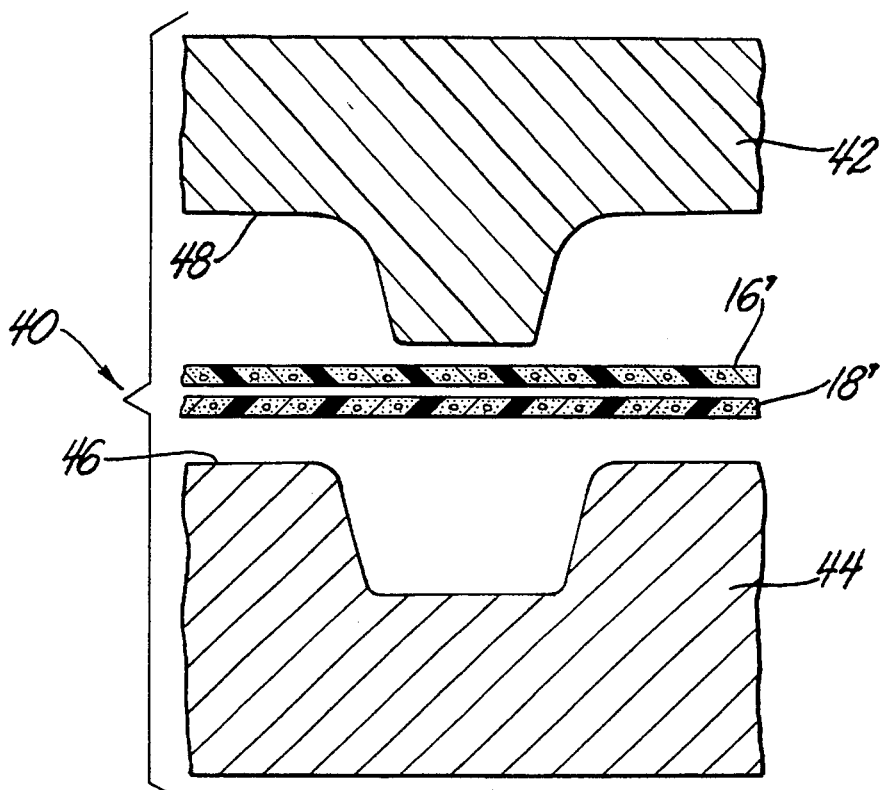
FIG. 6 is a partial sectional view of another press mold in preparation for molding the two sheets of foam to preform the foam layers of the panel in FIG. 1 without the urethane skin.
Figure 7:
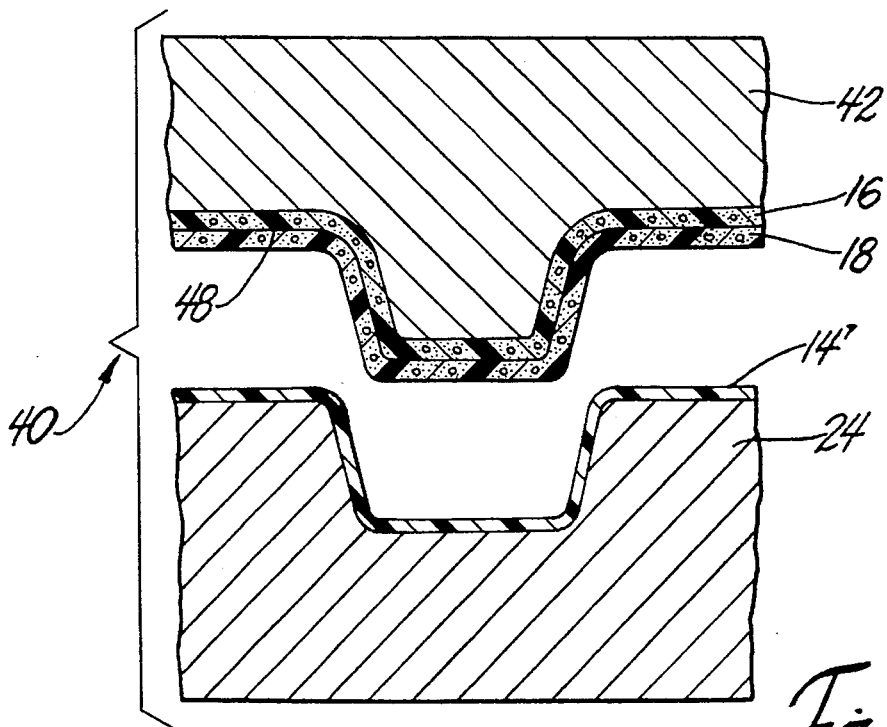
FIG. 7 is a view of the upper press die in FIG. 6 with the preformed foam layers attached thereto positioned over the lower press die in FIG. 3 with the urethane skin sprayed thereon in preparation to form the panel in FIG. 1.

While the whole process of forming the panel is preferably accomplished in a single press mold as described above, the substrate foam layer 16 and soft foam layer 18 can be preformed in another press mold 40 having an upper contour die 42 and lower contour die 44 as shown in FIG. 6. The contour dies 42 and 44 have a mold cavity 46 and projecting mold surface 48, respectively, similar to that in the press mold 26 but without graining in the surface of the cavity 46. The substrate foam layer 16 and soft foam layer 18 are preformed from the foam sheets 16' and 18' illustrated in FIG. 6 in a compression molding operation in the press mold 40 with the upper die heated as before to the compression molding temperature of between 200°–350° F. that accelerates the hardening compound. The thus preformed and bonded foam layers 16 and 18 are then attached to remain on the upper die 42 as illustrated in FIG. 7 or are attached to another upper die with a simple flat surface (not shown) and then press molded at the soft foam layer 18 to the sprayed urethane skin 14' on the lower die 24 as previously described while the sprayed skin is in a semi-cured state.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of making a lightweight panel of curved contour having a skin bonded to a foam layer that is bonded to a self-supporting foam layer, comprising the steps of providing a flexible substrate-forming foam sheet and a flexible second foam sheet, impregnating the substrate-forming foam sheet with a hardening compound that sets when heated to stiffen the impregnated foam sheet, applying a heat curable reactive urethane formulation to a contoured surface of a heated die of a press mold, forming a contoured urethane skin of substantially uniform thickness and developing the skin to a semi-cured state, arranging the second foam sheet over the urethane skin while maintaining the skin in the semi-cured state on the contour die and arranging the impregnated foam sheet over the second foam sheet in interfacial relationship therewith to form an assembly of the urethane skin and the foam sheets between the contour die and a complementary contour die of the press mold, and bonding the assembly together under heat and pressure in a compression molding operation in the press mold at a temperature to accelerate activation of the hardening compound rendering the substrate-forming foam sheet relatively hard, stiff and substantially less compressible than that of the second foam sheet to provide a self-supporting contoured structure and to bond the foam sheets to one another, and forcing the semi-cured skin material into interstices of the second foam sheet and thereafter curing the skin to bond the skin to the second foam layer.

2. A method as defined in claim 1, wherein the flexible second foam sheet is prepared as a sheet of flexible urethane foam.

3. A method as defined in claim 1, wherein both foam sheets are prepared as sheets of flexible urethane foam.

4. A method as defined in claim 1, wherein the heat curable reactive urethane formulation is prepared as a light and UV stable, aliphatic, urethane elastomer formulation.

5. A method of making a lightweight panel of curved contour having a skin bonded to a foam layer that is bonded to a self-supporting foam layer, comprising the steps of providing a flexible substrate-forming foam sheet and a flexible second foam sheet, impregnating the substrate-forming foam sheet with a compound that sets when heated to stiffen the impregnated foam sheet, arranging the impregnated foam sheet over the second foam sheet in interfacial relationship therewith to form an assembly of the foam sheets, bonding the assembly together under heat and pressure in a compression molding operation at a temperature to accelerate activation of the hardening compound rendering the substrate-forming foam sheet relatively hard, stiff and substantially less compressible than that of the second foam sheet to provide a self-supporting contoured structure and to bond the foam sheets to one another, applying a heat curable reactive urethane formulation to a contoured surface of a heated die of a press mold; forming a contoured urethane skin of substantially uniform thickness and controlling the temperature of the skin to develop and maintain the skin in a semi-cured state, arranging the self-supporting contoured structure opposite the semi-cured urethane skin and urging the self-supporting contoured structure and the urethane skin together under heat and pressure in a compression molding operation forcing the semi-cured skin material into interstices of the second foam sheet and thereafter curing the skin to bond the skin to the second foam layer.

6. A method as defined in claim 5, wherein the flexible second foam sheet is prepared as a sheet of flexible urethane foam.

7. A method as defined in claim 5 wherein both foam sheets are prepared as sheets of flexible urethane foam.

8. A method as defined in claim 5, wherein the heat curable reactive urethane formulation is prepared as a light and UV stable, aliphatic, urethane elastomer formulation.

* * * * *